(12) United States Patent
Li et al.

(10) Patent No.: US 12,376,105 B2
(45) Date of Patent: Jul. 29, 2025

(54) USER EQUIPMENT, BASE STATION, AND METHOD IN A NON-TERRESTRIAL NETWORK

(71) Applicant: SHARP KABUSHIKI KAISHA, Sakai (JP)

(72) Inventors: Yen-Hua Li, Taipei (TW); Yung-Lan Tseng, Taipei (TW); Chia-Hung Lin, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 312 days.

(21) Appl. No.: 18/083,726

(22) Filed: Dec. 19, 2022

(65) Prior Publication Data

US 2024/0267917 A1 Aug. 8, 2024

Related U.S. Application Data

(60) Provisional application No. 63/265,774, filed on Dec. 20, 2021.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 4/06* (2013.01); *H04W 72/23* (2023.01); *H04W 84/06* (2013.01)

(58) Field of Classification Search
CPC ... H04W 72/1273; H04W 4/06; H04W 72/23; H04W 84/06; H04L 1/1812;
(Continued)

(56) References Cited

U.S. PATENT DOCUMENTS

2020/0322921 A1* 10/2020 Zhou ............... H04W 72/30
2021/0021382 A1* 1/2021 Chien .............. H04L 1/1861
(Continued)

OTHER PUBLICATIONS

3GPP TR 38.821 V16.0.0 (Dec. 2019), 3rd Generation Partnership Project; Technical Specification Group Radio Access Network; Solutions for NR to support non-terrestrial networks (NTN) (Release 16).

(Continued)

*Primary Examiner* — Otis L Thompson, Jr.
(74) *Attorney, Agent, or Firm* — ScienBiziP, P.C.

(57) ABSTRACT

A method, UE, and BS in an NTN is provided. The method includes receiving, from the BS, a first parameter, a second parameter, and a Semi-Persistent Scheduling (SPS) configuration, the first parameter indicating whether HARQ feedback is enabled for a first Physical Downlink Shared Channel (PDSCH) after an activation of the SPS configuration, and the second parameter indicating a HARQ reporting mode; receiving, from the BS, Downlink Control Information (DCI), the DCI triggering the activation of the SPS configuration; receiving, from the BS, the first PDSCH; determining to apply the first parameter, if both the first parameter and the second parameter are simultaneously configured, and the first parameter indicates that the HARQ feedback is enabled for the first PDSCH after the activation of the SPS configuration; and transmitting, to the BS, HARQ-ACK information for the first PDSCH, wherein the first PDSCH is associated with a Multicast Broadcast Service (MBS).

15 Claims, 5 Drawing Sheets

(51) Int. Cl.
*H04W 4/06* (2009.01)
*H04W 72/23* (2023.01)
*H04W 84/06* (2009.01)

(58) Field of Classification Search
CPC ... H04L 1/1854; H04L 1/1861; H04L 1/1864; H04L 1/1896
See application file for complete search history.

(56) References Cited

U.S. PATENT DOCUMENTS

| | | | |
|---|---|---|---|
| 2021/0050948 A1* | 2/2021 | Gao | H04L 1/1812 |
| 2021/0084639 A1* | 3/2021 | Höglund | H04W 72/51 |
| 2022/0029733 A1* | 1/2022 | Ye | H04B 7/1851 |
| 2022/0046591 A1* | 2/2022 | Miao | H04W 72/0446 |
| 2022/0052779 A1* | 2/2022 | Ye | H04W 72/23 |
| 2022/0124783 A1* | 4/2022 | Park | H04W 72/121 |
| 2022/0183032 A1* | 6/2022 | Papasakellariou | H04L 1/1861 |
| 2022/0240283 A1* | 7/2022 | Hong | H04L 1/1896 |
| 2022/0279454 A1* | 9/2022 | Papasakellariou | H04W 72/23 |
| 2022/0311558 A1* | 9/2022 | Tsai | H04L 1/1614 |
| 2022/0322375 A1* | 10/2022 | Huang | H04W 72/044 |
| 2022/0322398 A1* | 10/2022 | Tsai | H04W 72/23 |
| 2023/0041764 A1* | 2/2023 | Park | H04L 1/1812 |
| 2023/0071767 A1* | 3/2023 | Zhou | H04L 1/1896 |
| 2023/0087510 A1* | 3/2023 | Papasakellariou | H04L 1/1854 370/329 |
| 2023/0156735 A1* | 5/2023 | Ying | H04L 1/1614 370/329 |
| 2023/0180269 A1* | 6/2023 | Li | H04W 72/30 370/312 |
| 2023/0232430 A1* | 7/2023 | Zhou | H04L 1/1887 370/312 |
| 2023/0344557 A1* | 10/2023 | Khoshkholgh Dashtaki | H04L 1/1812 |
| 2024/0214235 A1* | 6/2024 | Wang | H04L 12/1868 |
| 2024/0292413 A1* | 8/2024 | Jiang | H04W 72/1273 |
| 2024/0322950 A1* | 9/2024 | Wu | H04W 56/00 |
| 2025/0008506 A1* | 1/2025 | Yoshioka | H04W 72/232 |

OTHER PUBLICATIONS

3GPP TS 38.331 V16.6.0 (Sep. 2021), 3rd Generation Partnership Project; Technical Specification Group Radio Access Network; NR; Radio Resource Control (RRC) protocol specification (Release 16).
3GPP TS 38.300 V16.7.0 (Sep. 2021), 3rd Generation Partnership Project; Technical Specification Group Radio Access Network; NR; NR and NG-RAN Overall Description; Stage 2 (Release 16).
3GPP TS 38.321 V16.6.0 (Sep. 2021), 3rd Generation Partnership Project; Technical Specification Group Radio Access Network; NR; Medium Access Control (MAC) protocol specification (Release 16).
3GPP TS 38.213 V16.7.0 (Sep. 2021), 3rd Generation Partnership Project; Technical Specification Group Radio Access Network; NR; Physical layer procedures for control (Release 16).

* cited by examiner

USER EQUIPMENT, BASE STATION, AND METHOD IN A NON-TERRESTRIAL NETWORK

CROSS-REFERENCE TO RELATED APPLICATION(S)

The present disclosure claims the benefit of and priority to U.S. Provisional Patent Application Ser. No. 63/265,774, filed on Dec. 20, 2021, entitled "MECHANISMS OF HARQ FEEDBACK DISABLING IN NTN," the content of which is hereby incorporated herein fully by reference into the present disclosure for all purposes.

FIELD

The present disclosure is related to wireless communication and, more specifically, to communication in a Non-Terrestrial Network (NTN) in a wireless communication system.

BACKGROUND

Various efforts have been made to improve different aspects of wireless communication for cellular wireless communication systems, such as the fifth-generation (5G) New Radio (NR) system, by improving data rate, latency, reliability, and mobility in these systems. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to grow, there exists a need for further improvements in the art, such as improvements for communication in a Non-Terrestrial Network (NTN) in wireless communications.

SUMMARY

The present disclosure is related to communication between a User Equipment (UE) and a Base Station (BS), and their associated methods, in a Non-Terrestrial Network (NTN) in a wireless communication system.

In a first aspect of the present disclosure, a method performed by a User Equipment (UE) in a Non-Terrestrial Network (NTN) is provided. The method includes receiving, from a Base Station (BS), a first parameter, a second parameter, and a Semi-Persistent Scheduling (SPS) configuration, the first parameter indicating whether Hybrid Automatic Repeat reQuest (HARQ) feedback is enabled for a first Physical Downlink Shared Channel (PDSCH) after an activation of the SPS configuration, and the second parameter indicating a HARQ reporting mode; receiving, from the BS, Downlink Control Information (DCI), the DCI triggering the activation of the SPS configuration; receiving, from the BS, the first PDSCH; determining to apply the first parameter, if both the first parameter and the second parameter are simultaneously configured, and the first parameter indicates that the HARQ feedback is enabled for the first PDSCH after the activation of the SPS configuration; and transmitting, to the BS, HARQ-Acknowledgement (HARQ-ACK) information for the first PDSCH, wherein the first PDSCH is associated with a Multicast Broadcast Service (MBS).

In an implementation of the first aspect, the first parameter comprises a harq-feedbackEnablingforSPSactive-r17 parameter.

In an implementation of the first aspect, if the second parameter indicates a first HARQ reporting mode of the HARQ feedback, the UE provides the HARQ-ACK information to the BS in response to receiving the first PDSCH.

In an implementation of the first aspect, if the second parameter indicates a second HARQ reporting mode of the HARQ feedback, the UE provides the HARQ-ACK information to the BS only when the UE fails to decode the first PDSCH.

In an implementation of the first aspect, the second parameter comprises a harq-FeedbackOptionMulticast-r17 parameter.

In a second aspect of the present disclosure, a User Equipment (UE) of a wireless communication system in a Non-Terrestrial Network (NTN) is provided. The UE includes at least one processor; and at least one memory coupled to the at least one processor, wherein the at least one memory stores computer-executable instructions that, when executed by the at least one processor, cause the UE to receive, from a Base Station (BS), a first parameter, a second parameter, and a Semi-Persistent Scheduling (SPS) configuration, the first parameter indicating whether Hybrid Automatic Repeat reQuest (HARQ) feedback is enabled for a first Physical Downlink Shared Channel (PDSCH) after an activation of the SPS configuration, and the second parameter indicating a HARQ reporting mode; receive, from the BS, Downlink Control Information (DCI), the DCI triggering the activation of the SPS configuration; receive, from the BS, the first PDSCH; determine to apply the first parameter, if both the first parameter and the second parameter are simultaneously configured, and the first parameter indicates that the HARQ feedback is enabled for the first PDSCH after the activation of the SPS configuration; and transmit, to the BS, HARQ-Acknowledgement (HARQ-ACK) information for the first PDSCH, wherein the first PDSCH is associated with a Multicast Broadcast Service (MBS). In a third aspect of the present disclosure, a Base Station (BS) of a wireless communication system in a Non-Terrestrial Network (NTN) is provided. The BS includes at least one processor; and at least one memory coupled to the at least one processor, wherein the at least one memory stores computer-executable instructions that, when executed by the at least one processor, cause the BS to transmit, to a User Equipment (UE), a first parameter, a second parameter, and a Semi-Persistent Scheduling (SPS) configuration, the first parameter indicating whether Hybrid Automatic Repeat reQuest (HARQ) feedback is enabled for a first Physical Downlink Shared Channel (PDSCH) after an activation of the SPS configuration, and the second parameter indicating a HARQ reporting mode; transmit, to the UE, Downlink Control Information (DCI), the DCI triggering the activation of the SPS configuration; transmit, to the UE, the first PDSCH; and receive, from the UE, HARQ-Acknowledgement (HARQ-ACK) information for the first PDSCH, wherein the BS simultaneously configures the first parameter and the second parameter to the UE, and the first parameter transmitted to the UE indicates that the HARQ feedback is enabled for the first PDSCH after the activation of the SPS configuration, and the first PDSCH is associated with a Multicast Broadcast Service (MBS).

BRIEF DESCRIPTION OF THE DRAWINGS

Aspects of the present disclosure are best understood from the following detailed disclosure when read with the accompanying drawings. Various features are not drawn to scale.

Dimensions of various features may be arbitrarily increased or reduced for clarity of discussion.

DESCRIPTION

Figure 1:
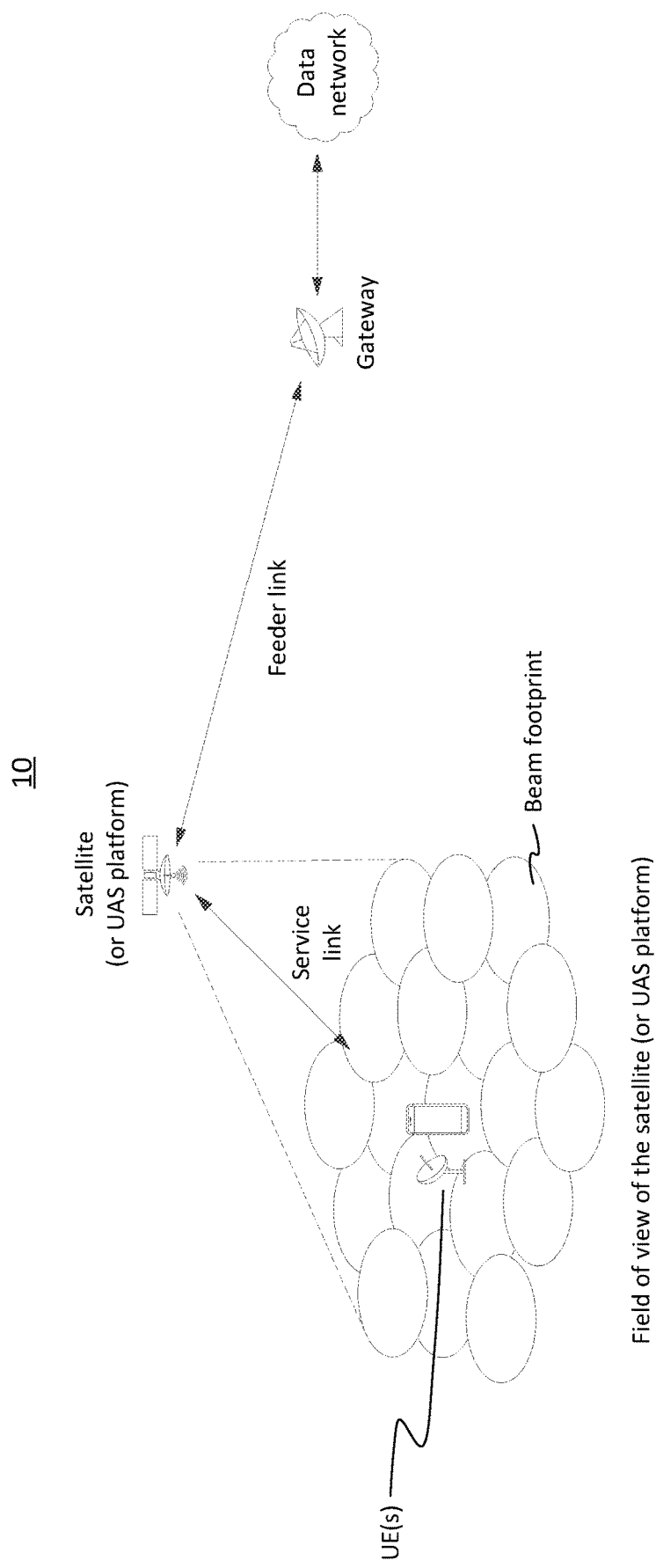
FIG. 1 is a diagram illustrating an NTN with a scenario based on a transparent payload, according to an example implementation of the present disclosure.

Some of the abbreviations used in this disclosure include:

Abbreviation Full Name

3GPP 3rd Generation Partnership Project
ACK Acknowledgement
AS Access Stratum
ATG Air-To-Ground
BS Base Station
BWP Bandwidth Part
C-RNTI Cell-Radio Network Temporary Identifier
CS-RNTI Configured Scheduling-Radio Network Temporary Identifier
CA Carrier Aggregation
CE Control Element
CN Core Network
CP Cyclic Prefix
CSI Channel State Information
DCI Downlink Control Information
DL Downlink
DM-RS DeModulation-Reference Signal
DRB Dedicated Radio Bearer
DRX Discontinuous Reception
eNB Evolved Node B
gNB Next Generation Node B
GEO Geostationary Earth Orbit
GNSS Global Navigation Satellite System
GSM Global System for Mobile communication
HAPS High Altitude Platform Station
HARQ Hybrid Automatic Repeat Request
ID Identifier/Identity
IE Information Element
LCH Logical Channel
LCID Logical Channel ID
LCP Logical Channel Prioritization
LEO Low Earth Orbit
MAC Medium Access Control
MBS Multicast Broadcast Service
MCG Master Cell Group
MEO Medium Earth Orbit
MN Master Node
MSG Message
MSGB-RNTI Message B-Radio Network Temporary Identifier
NAS Non-Access Stratum
NGEO Non-Geostationary Earth Orbit
NR New Radio
NTN Non-Terrestrial Network
NW Network
OFDM Orthogonal Frequency Division Multiplexing
PBCH Physical Broadcast Channel
PCell Primary Cell
PDCCH Physical Downlink Control Channel
PDCP Packet Data Convergence Protocol
PDSCH Physical Downlink Shared Channel
PDU Protocol Data Unit
PHY Physical Layer
PRACH Physical Random Access Channel
PRB Physical Resource Block
PSCell Primary Secondary Cell
PT-RS Phase Tracking-Reference Signal
PUCCH Physical Uplink Control Channel
PUSCH Physical Uplink Shared Channel
RA Random Access
RACH Random Access Channel
RAR Random Access Response
RAN Radio Access Network
Rel Release
RF Radio Frequency
RLC Radio Link Control
RRC Radio Resource Control
RS Reference Signal
RSRP Reference Signal Received Power
RTT Round Trip Time
RX Reception
SCell Secondary Cell
SCG Secondary Cell Group
SDAP Service Data Adaptation Protocol
SDU Service Data Unit
SFN System Frame Number
SI System Information
SIB System Information Block
SL Sidelink
SN Secondary Node
SpCell Special Cell
SPS Semi-Persistent Scheduling
SS Search Space
SSB Synchronization Signal and PBCH Block
SUL Supplementary Uplink
TA Time Alignment/Timing Advance
TAG TA Group
TB Transport Block
TC-RNTI Temporary Cell-Radio Network Temporary Identifier
TRP Transmission Reception Point
TS Technical Specification
Tx Transmission
UE User Equipment
UL Uplink
UMTS Universal Mobile Telecommunications System
UTR UE-Specific TA Reporting
URLLC Ultra-Reliable and Low Latency Communication
V2X Vehicle to Everything The following contains specific information related to implementations of the present disclosure. The drawings and their accompanying detailed disclosure are merely directed to implementations. However, the present disclosure is not limited to these implementations. Other variations and implementations of the present disclosure will be recognized by those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the so-disclosed combination, group, series, or equivalent. The expression "at least one of A, B and C", "at least one of A, B or C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may include computer-executable instructions stored on computer-readable media, such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuits (ASICs), programmable logic arrays, and/or one or more Digital Signal Processor (DSPs). Although some of the example implementations in the present disclosure are directed to software installed and executing on computer hardware, alternative example implementations implemented as firmware, as hardware, or as a combination of hardware and software are well within the scope of the present disclosure.

The computer-readable medium includes, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long-Term Evolution (LTE) system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core (5GC) Network or an Internet) through a RAN established by the BS/Cell.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but is not limited to, a Node B (NB) as in the Universal Mobile Telecommunication System (UMTS), an eNB as in the LTE-A, a Radio NW Controller (RNC) as in the UMTS, a Base Station Controller (BSC) as in the Global System for Mobile communications (GSM)/GSM EDGE (Enhanced Data rates for GSM Evolution) Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), LTE-A Pro, and a next generation RAT. However, the scope of the present disclosure should not be limited to the protocols previously disclosed.

A BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or an SCG may be called a SpCell. A PCell may refer to the SpCell of an MCG. A PSCell may refer to the SpCell of an SCG. MCG refers to a group of serving cells associated with an MN, including the SpCell and optionally one or more SCells. SCG refers to a group of serving cells associated with a Secondary Node (SN), including the SpCell and optionally one or more SCells.

In some implementations, the UE may not have (LTE/NR) RRC connections with the concerned serving cells of the associated services. In other words, the UE may not have UE-specific RRC signal exchange with the serving cell. Instead, the UE may only monitor the DL synchronization signals (e.g., DL synchronization burst sets) and/or broadcast SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the CP, may also be used. Additionally, two coding schemes are considered for NR: (1) low-density parity-check (LDPC) code and (2) polar code. The coding scheme adaptation may be configured based on the channel conditions and/or service applications.

It should also be noted that in a transmission time interval of a single NR frame, at least DL transmission data, a guard period, and UL transmission data should be included. The respective portions of the DL transmission data, the guard period, and the UL transmission data should also be configurable, for example, based on the NW dynamics of NR. In addition, SL resources may also be provided in an NR frame to support ProSe services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following invention(s) may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

Non-Terrestrial Networks (NTN) Overview

Figure 2:
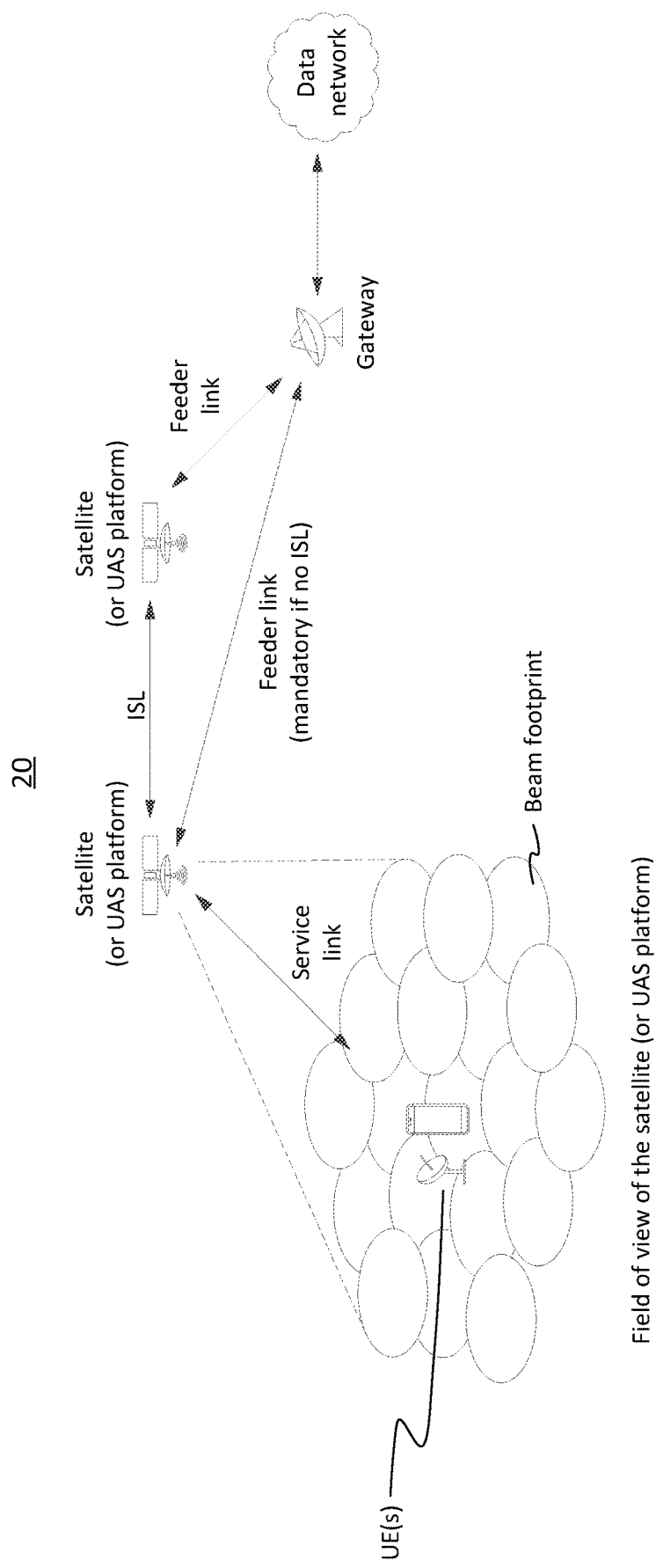
FIG. 2 is a diagram illustrating an NTN with a scenario based on a regenerative payload, according to an example implementation of the present disclosure.

In some implementations, the NTN may refer to a NW or segment of NWs using RF resources onboard a satellite (or UAS (Unmanned Aircraft System) platform). The typical scenarios for the NTN providing access to one UE are depicted in FIG. 1 and FIG. 2. FIG. 1 is a diagram illustrating an NTN 10 with a scenario based on transparent payload, according to an example implementation of the present disclosure; and FIG. 2 is a diagram illustrating an NTN 20 with a scenario based on regenerative payload, according to an example implementation of the present disclosure.

In some implementations, the NTN may feature the following elements:

One or several sat-gateways that connect the NTN to a public data NW, including:
  a Geostationary Earth Orbit (GEO) satellite that may be fed by one or several sat-gateways which are deployed across the satellite targeted coverage (e.g. a regional coverage or a continental coverage). It is assumed that the UE in a cell may be served by only one sat-gateway.
  a Non-GEO satellite that may be served successively by one or several sat-gateways at a time. The system may ensure service and feeder link continuity between the successive serving sat-gateways with sufficient time duration to proceed with mobility anchoring and hand-over.
A Feeder link that may be a radio link between a sat-gateway and the satellite (or UAS platform).
A service link that may be a radio link between the UE and the satellite (or UAS platform).

Dynamic Scheduling

In some implementations, the gNB may dynamically allocate resources to UEs via the C-RNTI on PDCCH(s) in the DL. A UE may monitor the PDCCH(s) in order to find possible assignments when a DL reception of the UE is enabled (e.g., an activity governed by DRX while being configured). When the CA is configured, the same C-RNTI may apply to all serving cells.

Semi-Persistent Scheduling (SPS)

In some implementations, when equipped with Semi-Persistent Scheduling (SPS), the gNB may allocate DL resources for initial HARQ transmissions to UEs (e.g., via DL-specific RRC signaling). Specifically, the RRC (signaling) may define a periodicity of configured DL assignments while a PDCCH addressed to a CS-RNTI can either signal and activate the configured DL assignment, or deactivate the configured DL assignment. In other words, the PDCCH addressed to the CS-RNTI indicates that the DL assignment can be implicitly reused according to the periodicity defined by the RRC (signaling) until the configured DL assignment is deactivated. Noticeably, retransmissions may be explicitly scheduled on PDCCH(s), if required.

In some implementations, the dynamically allocated DL reception may override the configured DL assignment in the same serving cell, if both the dynamically allocated DL reception and the configured DL assignment overlap in the time domain. Alternatively, a DL reception according to the configured DL assignment may be assumed/considered, if the configured DL assignment is activated.

In some implementations, the UE may be configured with up to 8 active configured DL assignments for a given BWP of a serving cell. When more than one active configured DL assignment is configured:

the NW may decide which of these configured DL assignments are activated at a time (including all of them); and
  each configured DL assignment is activated separately via one DCI command, and deactivation of configured DL assignments is done via another DCI command, which can deactivate either one single configured DL assignment or a plurality of configured DL assignments.

Hybrid Automatic Repeat Request (HARQ)

In 3GPP specifications, a DL HARQ is a retransmission mechanism that allows the UE to return/feedback a decoding result (e.g., ACK for acknowledgement, or NACK for non-acknowledgement) of a Transport Block (TB) received on a PDSCH or an SPS PDSCH in order to enable a L1/L2 retransmission. The decoding result as "ACK/NACK" may also be called HARQ-ACK information. Also, in addition to the return/feedback of the HARQ-ACK information in response to the PDSCH and SPS PDSCH reception, the UE may return/feedback an ACK in response to a reception of DCI format indicating an SPS release (e.g., an SPS deactivation).

Groupcast/Multicast and Broadcast

In some implementations for telecommunication, the point-to-multipoint (e.g., PTM, P2MP, PTMP, PMP) communication is a communication that is accomplished via a distinct type of one-to-many connection, providing multiple paths from a single location to multiple locations. Specifically, groupcast and multicast (so called as another name of the PTM) means that a node in a NW may simultaneously transmit the same data to a group of nodes. For example, the above description, as specified in 3GPP specifications, may present as "one gNB may simultaneously transmit the same data to a group of UEs", which means the gNB may perform a group scheduling. As such, the HARQ retransmission mechanism may have at least the following two options:

1. ACK-NACK: Each UE scheduled by means of groupcast/multicast may need to transmit the HARQ-ACK information (e.g., the ACK/NACK) to the gNB to inform whether the TB has been detected and decoded correctly. In this option, each UE has to be configured a dedicated UL resource(s).

2. NACK-only: Each UE scheduled by means of groupcast/multicast may need to transmit the HARQ-ACK information to the gNB, so as to inform that the UE did not decode the TB correctly. The UE may not need to transmit the HARQ-ACK information to the (serving) gNB (or serving cell) if the UE detects and decodes the TB correctly. In this option, all UEs may transmit NACK, if any, on the same UL resource configured by the gNB.

Sidelink (SL)

In some implementations, the SL may support UE-to-UE direct communication using: (1) SL resource allocation modes, (2) physical SL channels and signals; and (3) physical layer procedures for SL. More details are specified below.

SL Resource Allocation Modes

In some implementations, two SL resource allocation modes are supported, e.g., mode 1 and mode 2. In the mode 1, the SL resource allocation may be provided by the NW. In the mode 2, the UE may determine the SL transmission resources in the resource pool(s).

Physical SL Channels and Signals

In some implementations, a Physical Sidelink Control Channel (PSCCH) indicates the resource and other transmission parameters used by a UE for Physical Sidelink Shared Channel (PSSCH), where a PSCCH transmission may be associated with a DM-RS.

In some implementations, the PSSCH may transmit the TBs of data, control information for HARQ procedures, and CSI feedback triggers, etc. Specifically, at least 6 Orthogonal Frequency Division Multiplexing (OFDM) symbols within a slot may be used for the PSSCH transmission, where the PSSCH transmission may be associated with a DM-RS and may be associated with a PT-RS.

In some implementations, a Physical Sidelink Feedback Channel (PSFCH) may carry HARQ feedback over the SL from a UE, where the UE is intended to receive a PSSCH transmission. A PSFCH sequence may be transmitted in one PRB repeated over two OFDM symbols near the end of the SL resource in a slot.

In some implementations, an SL synchronization signal includes SL primary synchronization signals (S-PSSs) and SL secondary synchronization signals (S-SSSs), where each of the S-PSSs and S-SSSs may occupy 2 symbols and 127 subcarriers. A Physical Sidelink Broadcast Channel (PSBCH) may occupy 9 symbols for a normal case and occupy 5 symbols for an extended CP case, respectively, and the PSBCH includes the associated DM-RS.

Physical Layer Procedures for SL

HARQ Feedback

In some implementations, an SL HARQ feedback may use a PSFCH to be operated in one of two options. In one option being configured for unicast and groupcast, the PSFCH may transmit either ACK or NACK via a resource dedicated to one UE transmitting a single PSFCH. In another option being configured for groupcast, the PSFCH may transmit NACK (or no PSFCH signal may be transmitted) on a resource that can be shared by a plurality of UEs transmitting the PSFCH.

In some implementations, for an SL resource allocation mode 1, a UE that receives the PSFCH may be configured to report SL HARQ feedback to one gNB via a PUCCH or a PUSCH.

Power Control

In some implementations, for an in-coverage operation, a power spectral density of the SL transmissions may be adjusted based on a pathloss from the gNB.

In some implementations, for unicast, the power spectral density of some SL transmissions may be adjusted based on the pathloss between the two communicating UEs.

Channel State Information (CSI) Report

In some implementations, for unicast, a CSI-RS may be supported for a CSI measurement and reporting in SL. Specifically, a CSI report may be carried in an SL MAC CE.

Examples of some terms used in this disclosure are provided as follows.

UE: May be referred to as a PHY/MAC/RLC/PDCP/SDAP entity. The PHY/MAC/RLC/PDCP/SDAP entity may be referred to as the UE.

NW: May be a network node, a TRP, a cell (e.g., SpCell (Special Cell), PCell, PSCell, and/or SCell), a eNB, a gNB, and/or a BS.

Serving Cell: May be a PCell (Primary Cell), a PSCell, or an SCell (Secondary Cell). The serving cell may be an activated or a deactivated serving cell.

SpCell: For Dual Connectivity operation, the SpCell refers to the PCell of the MCG or the PSCell of the SCG depending on if the MAC entity is associated to the MCG or the SCG, respectively. Alternatively, the SpCell refers to the PCell. The SpCell may support a PUCCH transmission and contention-based RA, and may be always activated.

Geostationary Earth Orbit (GEO): May be a circular geosynchronous orbit 35,786 kilometers (km) above the Earth's equator and following the direction of Earth's rotation.

High Altitude Platform Station (HAPS): May be an airborne vehicle carrying the NTN payload, placed at an altitude between 8 and 50 km.

Satellite: May be a space-borne vehicle carrying the NTN payload, placed into Non-Geostationary Earth Orbit (NGEO) or GEO.

Service link: May be a wireless link between the NTN payload and one UE.

UE-gNB RTT: For the NTN, the sum of the UE's TA value and K_mac.

HARQ Feedback Disabling for SPS Activation Signaling

In some implementations, a UE may be configured to enable or disable a functionality of HARQ feedback for HARQ processes associated with (a) configured DL assignment(s) by the NW via one dedicated RRC signaling. Specifically, the dedicated RRC signaling may be one or more RRC parameters, where one of the RRC parameters may be HARQ-feedbackEnablingforSPSactive-r17. Alternatively, one of the RRC parameters may be HARQ-feedbackEnabling-disablingper HARQprocess-r17.

In some implementations, the RRC parameter(s) may be provided to a UE only if one or more SPS configuration(s) is/are provided to the UE via dedicated RRC signaling. In one example, the RRC parameter(s) may be provided to a UE only if the functionality of HARQ feedback of one or more HARQ processes is disabled. Specifically, the SPS configuration(s) may be provided by an RRC parameter sps-Config. Alternatively, the SPS configuration(s) may be provided by an RRC parameter sps-Config ToAddModList-r16.

In some implementations, if the RRC parameter(s) is/are not provided, the UE may consider that the functionality of HARQ feedback of all SPS configurations, if any, is disabled.

In one example, the functionality of HARQ feedback for SPS PDSCHs may be enabled/disabled on a per-HARQ-process basis.

In one aspect, if a UE receives, on a PDCCH, a DCI format indicating an SPS activation, the UE may return/feedback the HARQ-ACK information in response to one first SPS PDSCH reception after the DCI format only if the HARQ feedback of the HARQ process associated with the SPS PDSCH is enabled by an RRC parameter/RRC parameters. Specifically, a name of the RRC parameter may be HARQ-feedbackEnabling-disablingperHARQprocess-r17; a name of one of the RRC parameters may be HARQ-feedbackEnabling-disablingperHARQprocess-r17; a name of the RRC parameter may be HARQ-feedbackEnabling-disablingperSPSconfiguration-r17; and a name of one of the RRC parameters may be HARQ-feedbackEnabling-disablingperSPSconfiguration-r17.

In another aspect, if a UE receives, on a PDCCH, a DCI format indicating the SPS activation, the UE may not return/feedback the HARQ-ACK information in response to a second and subsequent SPS PDSCHs receptions after the DCI format if the HARQ feedback of the HARQ process associated with the SPS PDSCH reception(s) is enabled or disabled by an RRC parameter/RRC parameters. Specifically, a name of the RRC parameter may be HARQ-feedbackEnabling-disablingperHARQprocess-r17; a name of one of the RRC parameters may be HARQ-feedbackEnabling-disablingperHARQprocess-r17; a name of the RRC parameter may be HARQ-feedbackEnabling-disablingperSPSconfiguration-r17; and a name of one of the RRC parameters may be HARQ-feedbackEnabling-disablingperSPSconfiguration-r17.

In one alternative, the functionality of HARQ feedback for SPS PDSCHs may be enabled/disabled on a per-SPS-configuration basis.

In one aspect, if a UE receives, on a PDCCH, a DCI format indicating the SPS activation, the UE may return/feedback the HARQ-ACK information in response to the first SPS PDSCH scheduled by the DCI format only if the HARQ feedback of the SPS configuration activated by the DCI format is enabled by an RRC parameter/RRC parameters. Specifically, a name of the RRC parameter may be HARQ-feedbackEnabling-disablingperHARQprocess-r17; a name of one of the RRC parameters may be HARQ-feedbackEnabling-disablingperHARQprocess-r17; a name of the RRC parameter may be HARQ-feedbackEnabling-disablingperSPSconfiguration-r17; and a name of one of the RRC parameters may be HARQ-feedbackEnabling-disablingperSPSconfiguration-r17.

In another aspect, if a UE receives a DCI indicating the SPS activation, the UE may not return/feedback the HARQ information in response to the second and subsequent SPS PDSCHs scheduled by the DCI format only if the HARQ feedback of the SPS configuration activated by the DCI format is disabled by an RRC parameter/RRC parameters. Specifically, a name of the RRC parameter may be HARQ-feedbackEnabling-disablingperHARQprocess-r17; a name of one of the RRC parameters may be HARQ-feedbackEnabling-disablingperHARQprocess-r17; a name of the RRC parameter may be HARQ-feedbackEnabling-disablingperSPSconfiguration-r17; and a name of one of the RRC parameters may be HARQ-feedbackEnabling-disablingperSPSconfiguration-r17.

In one example, the functionality of HARQ feedback for SPS PDSCHs may be enabled/disabled on a per-BWP (e.g., a per DL-BWP) basis. In another example, the functionality of HARQ feedback for SPS PDSCHs may be enabled/disabled on a per-component carrier basis.

UE Behaviors

In one implementation, when an SPS PDSCH transmission occurs during one HARQ process, the MAC Entity may:

1> if the UE considers that the HARQ feedback is enabled for SPS activation:
  2> if the HARQ feedback is disabled according to HARQ-feedbackEnabling-disablingperHARQprocess-r17:
    3> if the SPS PDSCH is the first SPS PDSCH after the SPS activation:
      4> instruct the physical layer to generate ACK(s) of data in one TB.
    3> else:
      4> not instruct the physical layer to generate ACK(s) of the data in the TB.
  2> else (if the HARQ feedback is enabled):
    3> instruct the physical layer to generate ACK(s) of the data in the TB.
1> else (if the UE considers that the HARQ feedback is disabled for the SPS activation):
  2> if the HARQ feedback is disabled according to HARQ-feedbackEnabling-disablingperHARQprocess-r17:
    3> not instruct the physical layer to generate ACK(s) of the data in the TB.
  2> else (if the HARQ feedback is enabled):
    3> instruct the physical layer to generate ACK(s) of the data in the TB.

Examples of Specification Impact

In one implementation, specifications may include (part of) the following (per SPS configuration):

---

The MAC entity may:

1> if this is a new transmission:
  2> attempt to decode a received data.
1> else if this is a retransmission:

-continued

| The MAC entity may: |
|---|
| 2> if a data for this TB has not yet been successfully decoded:<br>   3> instruct the physical layer to combine the received data with data currently in the soft buffer for this TB and attempt to decode the combined data.<br>1> if the data that the MAC entity attempted to decode was successfully decoded for this TB; or<br>1> if the data for this TB was successfully decoded before:<br>  2> if a HARQ process is equal to the broadcast process:<br>   3> deliver a decoded MAC PDU to upper layers.<br>  2> else if this is a first successful decoding of the data for this TB:<br>   3> deliver the decoded MAC PDU to the disassembly and demultiplexing entity.<br>1> else:<br>  2> instruct the physical layer to replace the data in the soft buffer for this TB with the data which the MAC entity attempted to decode.<br>1> if the HARQ process is associated with a transmission indicated with a TC-RNTI and the Contention Resolution is not yet successful; or<br>1> if the HARQ process is associated with a transmission indicated with a MSGB-RNTI and the RA procedure is not yet successfully completed; or<br>1> if the HARQ process is equal to the broadcast process; or<br>1> if the timeAlignmentTimer, associated with the TAG including the Serving Cell on which the HARQ feedback is to be transmitted, is stopped or expired; or<br>1> if the HARQ process is configured with the disabled HARQ feedback; or if the HARQ process is used for a configured DL assignment (e.g., the SPS PDSCH), and the higher layer parameter indicates that the HARQ feedback is disabled for the SPS activation, and the higher layer parameter indicates that the HARQ feedback of the configured DL assignment is disabled, and the TB is not received on the first SPS PDSCH after the SPS activation:<br>  2> the MAC entity may not instruct the physical layer to generate ACK(s) of the data in this TB.<br>1> else:<br>  2> instruct the physical layer to generate ACK(s) of the data in this TB. |

In one implementation, specifications may include (part of) the following (e.g., per (HARQ) process):

| The MAC entity may: |
|---|
| 1> if this is a new transmission:<br>  2> attempt to decode the received data.<br>1> else if this is a retransmission:<br>  2> if the data for this TB has not yet been successfully decoded:<br>   3> instruct the physical layer to combine the received data with a data currently in the soft buffer for this TB and attempt to decode the combined data.<br>1> if the data which the MAC entity attempted to decode was successfully decoded for this TB; or<br>1> if the data for this TB was successfully decoded before:<br>  2> if a HARQ process is equal to the broadcast process:<br>   3> deliver the decoded MAC PDU to upper layers.<br>  2> else if this is a first successful decoding of the data for this TB:<br>   3> deliver a decoded MAC PDU to the disassembly and demultiplexing entity.<br>1> else:<br>  2> instruct the physical layer to replace the data in the soft buffer for this TB with the data which the MAC entity attempted to decode.<br>1> if the HARQ process is associated with a transmission indicated with a TC-RNTI and the Contention Resolution is not yet successful; or<br>1> if the HARQ process is associated with a transmission indicated with a MSGB-RNTI and an RA procedure is not yet successfully completed; or<br>1> if the HARQ process is equal to the broadcast process; or<br>1> if the timeAlignmentTimer, associated with the TAG including the Serving Cell on which a HARQ feedback is to be transmitted, is stopped or expired; or<br>1> if the HARQ process is configured with the disabled HARQ feedback; or<br>1> if the HARQ process is used for a configured DL assignment (e.g., the SPS PDSCH), the higher layer parameter indicates that the HARQ feedback is disabled for the SPS activation, the higher layer parameter indicates that the HARQ feedback of the HARQ process is disabled, and the TB is not received on the first SPS PDSCH after the SPS activation:<br>  2> the MAC entity may not instruct the physical layer to generate ACK(s) of the data in this TB.<br>1> else:<br>  2> instruct the physical layer to generate ACK(s) of the data in this TB. |

Extension of HARQ Feedback Disabling for SPS Activation to Groupcast/Multicast In some implementations, the concept of groupcast/multicast may be applied to NTN scenarios. The disabling mechanism of the HARQ feedback for the SPS activation, as described above, may be combined with the following groupcast/multicast mechanism(s).

In some implementations, a UE may be configured to enable or disable the functionality of HARQ feedback of the activation for (a) configured DL assignment(s), e.g., SPS PDSCH(s).

In some implementations, a UE may receive a DCI format that schedules (a) PDSCH(s) and indicates that this (these) PDSCH(s) may be (a) multicast PDSCH(s), where the DCI format may also indicate a mode of HARQ feedback for this/these PDSCH(s). Specifically, a name of "multicast PDSCH" may be replaced by "group-scheduled PDSCH", "group-PDSCH", and/or "GPDSCH".

In some implementations, a UE may receive a DCI format scheduling (a) multicast PDSCH(s), where the mode of the HARQ feedback for this/these multicast PDSCH(s) may be indicated by this DCI format or may be configured by (an) upper layer(s), e.g., a (dedicated) RRC signaling. Specifically, if the mode of the HARQ feedback for the multicast PDSCH(s) is configured by (an) upper layer(s), e.g., an RRC parameter, and if the RRC parameter is not provided, the UE may determine that the mode of the HARQ feedback for the multicast PDSCH(s) is ACK-NACK.

In one example, the mode of the HARQ feedback indicated by the DCI format may be ACK-NACK. The UE may need to return/feedback the HARQ-ACK information (e.g., a decoding result) in response to the multicast PDSCH(s) to the gNB no matter whether the HARQ-ACK information is ACK or NACK. In another example, the mode of HARQ feedback indicated by the DCI format may be NACK-only. The UE may need to return/feedback the HARQ-ACK information in response to the multicast PDSCH(s) to the gNB only if the HARQ-ACK information is NACK, which means that the UE may detect a presence of the group-scheduled PDSCH(s) but fail to decode the group-scheduled PDSCH. In another example, the mode of HARQ feedback indicated by the DCI format may be 'disabled'. The UE may not need to return/feedback the HARQ-ACK information in response to the multicast PDSCH(s) to the gNB. In another example, the mode of HARQ feedback indicated by the DCI format may be ACK-only. The UE may need to return/feedback the HARQ-ACK information in response to the multicast PDSCH(s) to the gNB only if the HARQ-ACK information is ACK, which means that the UE may detect the presence of the group-scheduled PDSCH(s) and successfully decode the multicast PDSCH(s).

In some implementations, a UE may be configured to enable or disable the functionality of (multi-cast/MBS) HARQ feedback in a per-HARQ-process basis or in a per-SPS-configuration basis (e.g., via an RRC signaling or a MAC CE), where the UE may follow corresponding procedures/behaviors as described above.

In some implementations, a UE may receive a DCI format indicating an activation of (a) multicast configured DL assignments (e.g., multicast SPS PDSCH(s)), where the mode of the HARQ feedback for this/these multicast SPS PDSCH(s) may be indicated by this DCI format or may be configured by (an) upper layer(s) (e.g., the dedicated RRC signaling). Specifically, if the mode of the HARQ feedback for multicast SPS PDSCH(s) is configured by (an) upper layer(s), e.g., an RRC parameter, and if the RRC parameter is not provided, the UE may determine that the mode of the HARQ feedback for the multicast SPS PDSCH(s) is ACK-NACK.

In one example, the mode of the HARQ feedback indicated by the DCI format may be ACK-NACK. The UE may need to return/feedback the HARQ-ACK information (e.g., a decoding result) in response to the multicast SPS PDSCH(s) to the gNB no matter whether the HARQ-ACK information is ACK or NACK. In another example, the mode of the HARQ feedback indicated by the DCI format may be NACK-only. The UE may need to return/feedback the HARQ-ACK information in response to the multicast SPS PDSCH(s) to the gNB only if the HARQ-ACK information is NACK, which means that the UE may detect the presence of the group-scheduled SPS PDSCH(s) but fail to decode the group-scheduled PDSCH. In another example, the mode of the HARQ feedback indicated by the DCI format may be 'disabled'. The UE may not need to return/feedback the HARQ-ACK information in response to the multicast SPS PDSCH(s) to the gNB. In another example, the mode of the HARQ feedback indicated by the DCI format may be ACK-only. The UE may need to return/feedback the HARQ-ACK information in response to the multicast PDSCH(s) to the gNB only if the HARQ-ACK information is ACK, which means that the UE detected the presence of the group-scheduled PDSCH(s) and successfully decoded the multicast PDSCH(s).

In some implementations, the DCI format may be DCI format 1_0, DCI format 1_1, DCI format 1_2, DCI format 4_0, DCI format 4_1, and/or DCI format 4_2. In some implementations, the HARQ-ACK information may be transmitted on the PUCCH/PUSCH configured by the gNB.

In some implementations, when multicast is implemented in the NTN scenario, a UE may be simultaneously configured for enabling/disabling of the HARQ feedback for the NTN by the NW (e.g., via the dedicated RRC signaling) and indicated a mode of the HARQ feedback for the MBS (e.g., ACK-NACK, ACK-only, NACK-only, and/or disabled) by the gNB via the DCI format. In one example, the UE may determine whether to transmit the HARQ-ACK information of a received TB based on a first HARQ feedback enabling/disabling for the NTN and then based on the mode of the HARQ feedback for the MBS. In another example, the UE may determine whether to transmit the HARQ-ACK information of the received TB based on the mode of the HARQ feedback for the MBS and then based on the HARQ feedback enabling/disabling for the NTN.

In some implementations, the UE may decide whether to reply with the HARQ-ACK information of one received (MBS) TB based on the mode of the HARQ feedback (e.g., being enabled/disabled) associated with the MBS (TB). Noticeably, the dynamic grant or (DL) SPS (configured) grant received by the UE may be applied with the similar mechanism/operation/procedure.

In some implementations, the HARQ state configuration specific for MBS packet reception may be broadcast by the serving cell via broadcast SI (e.g., one SIB) or via SI on-demand procedure.

In some implementations, one HARQ state configuration configured by the serving RAN may be applied to the UE for dynamic grant, SPS configured grant (for unicast service/DRB), or SPS configured grant (for MBS/MBS Radio Bearer (MRB)/Point-to-Point (PtP) leg of one or more MRB(s)/Point-to-Multi-point (PtM) leg of one or more MRB(s)). In some other implementations, another HARQ state configuration is provided for the MBS, e.g., for one or more MBS(s)/for one or more MRB(s)/for one or more PtP leg of MRB(s)/for one or more PtM leg of MRB(s). In some implementations, the HARQ state configuration specific for the MBS may or may not overwrite or replace the (NTN) HARQ state configuration transmitted by a (NTN) cell. In some implementations, the (NTN/common) HARQ state configuration configured by a (NTN) cell may or may not overwrite or replace the HARQ state configuration specific for the MBS. More specifically, what "a configuration A overwrites a configuration B" means is that "when a configuration A and a configuration B are both configured to the UE, the UE may apply/follow the configuration A and ignore the configuration B. In other words, the configuration B is inapplicable to the UE".

Extension of Disabling of HARQ Feedback for SPS Activation to SL

The concept of SL/V2X may be applied to the NTN scenario. The mechanism of disabling of the HARQ feedback for the SPS activation, as introduced in "HARQ Feedback Disabling for SPS Activation", may be combined with SL/V2X HARQ operation.

In some implementations, if a UE is served by a gNB through, e.g., a satellite or a HAPS, e.g., the UE is an NTN UE supporting the SL, the UE may be called an "SL NTN UE" or an "NTN SL UE".

In some implementations, an SL NTN UE may be configured 1) whether to enable or disable the functionality of HARQ feedback of the SPS activation, and 2) whether to enable or disable the functionality of HARQ feedback on a per-HARQ-process basis or on a per-SPS-configuration basis.

In some implementations, an SL NTN UE may receive the HARQ-ACK feedback(s) from the peer UE(s) on the SL channel(s) configured by upper layers. If the SL NTN UE is configured with UL resources to transmit the HARQ-ACK information, which is received on the SL channel(s), in response to the peer UE(s) to the gNB/NW, and the SL NTN UE is also configured to enable or disable the functionality of HARQ feedback on a per-HARQ-process basis by upper layers, the UE may determine whether to transmit the HARQ-ACK information to the gNB based on the HARQ feedback disabling configuration.

Noticeably, the "an SL NTN UE" may be replaced by "the MAC entity of an SL NTN UE" and "the SL NTN UE" may be replaced by "the MAC entity of the SL NTN UE". Also, the proposed mechanisms in "HARQ Feedback Disabling for SPS Activation" and/or "Extension of HARQ Feedback Disabling for SPS Activation to Groupcast/Multicast" may be applicable to the NR SL (communication) service and/or E-UTRA V2X SL communication service(s).

Figure 3:
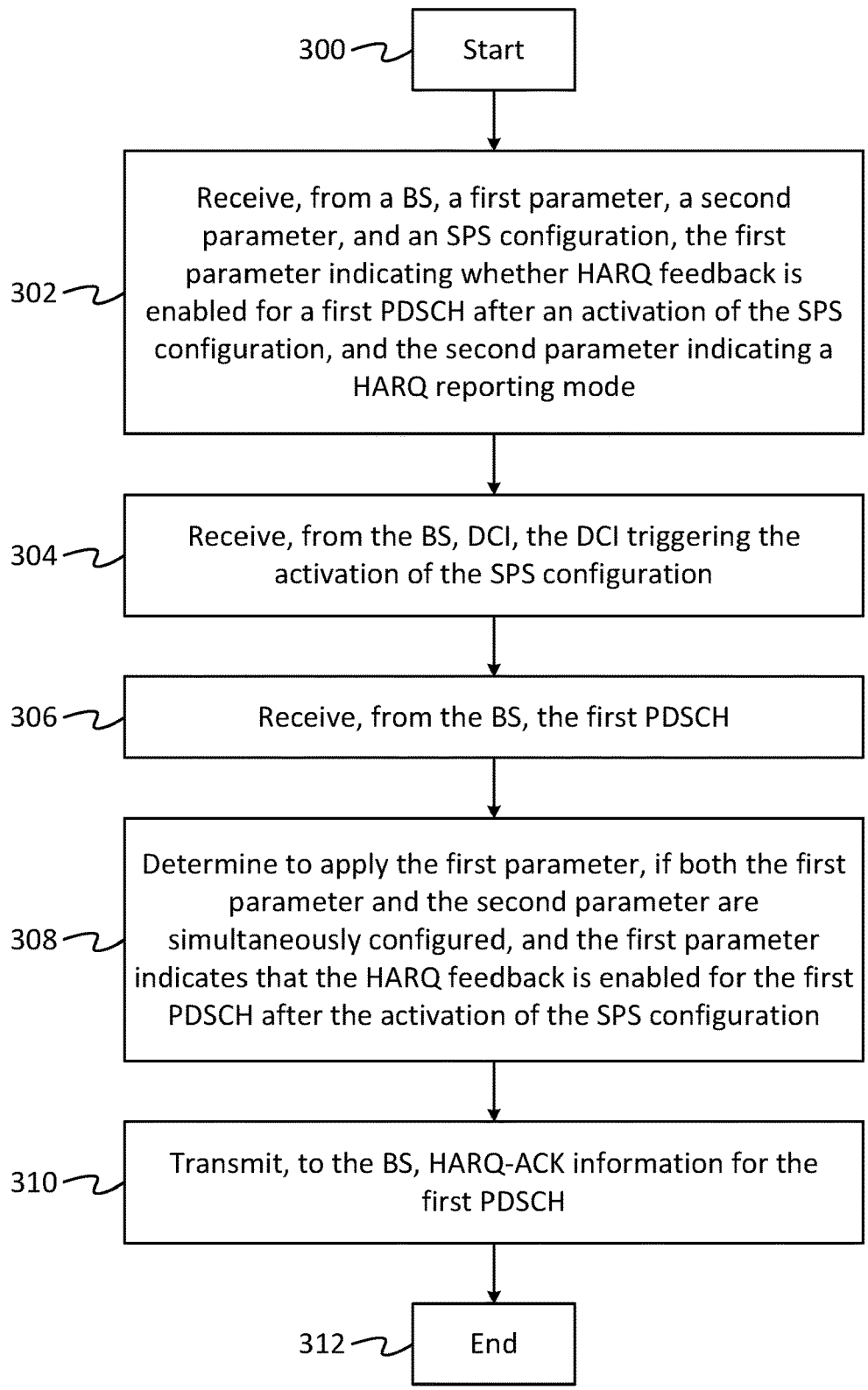
FIG. 3 is a flowchart illustrating a procedure performed by a UE in an NTN, according to an example implementation of the present disclosure.

FIG. 3 is a flowchart illustrating a procedure 30 performed by a UE in an NTN, according to an example implementation of the present disclosure. In the example of FIG. 3, the actions of the procedure 30, as illustrated in the figure, are separate actions that are represented as independent blocks. In some other implementations, these separate actions may not be construed as necessarily order dependent, where any two or more actions may also be performed and/or combined with each other or be integrated with other alternate actions that are not limiting the scope of the disclosure. Moreover, in some implementations, one or more of the actions may be adaptively omitted.

As shown in FIG. 3, the procedure 30 for the UE includes the following actions:

Action 300: Start.

Action 302: Receive, from a BS, a first parameter, a second parameter, and an SPS configuration, the first parameter indicating whether HARQ feedback is enabled for a first PDSCH after an activation of the SPS configuration, and the second parameter indicating a HARQ reporting mode.

Action 304: Receive, from the BS, DCI, the DCI triggering the activation of the SPS configuration.

Action 306: Receive, from the BS, the first PDSCH.

Action 308: Determine to apply the first parameter, if both the first parameter and the second parameter are simultaneously configured, and the first parameter indicates that the HARQ feedback is enabled for the first PDSCH after the activation of the SPS configuration.

Action 310: Transmit, to the BS, HARQ-ACK information for the first PDSCH.

Action 312: End.

In some implementations, in action 302, the UE may receive the first parameter, the second parameter, and the SPS configuration from a BS. Specifically, the first parameter may indicate whether the HARQ feedback is enabled for the first PDSCH after the activation of the SPS configuration, and the second parameter may indicate the HARQ reporting mode.

In some implementations, in action 304, the UE may receive the DCI from the BS. Specifically, the DCI may trigger the activation of the SPS configuration. In action 306, the UE may receive the first PDSCH from the BS. Specifically, the first PDSCH may be associated with the MBS.

In some implementations, in action 308, the UE may determine to apply the first parameter, if both the first parameter and the second parameter are simultaneously configured, and the first parameter indicates that the HARQ feedback is enabled for the first PDSCH after the activation of the SPS configuration. In action 310, the UE may transmit the HARQ-ACK information for the first PDSCH to the BS.

In some implementations, if the second parameter indicates a first HARQ reporting mode of the HARQ feedback, the UE may provide the HARQ-ACK information to the BS in response to receiving the first PDSCH. Alternatively, if the second parameter indicates a second HARQ reporting mode of the HARQ feedback, the UE may provide the HARQ-ACK information to the BS only when the UE fails to decode the first PDSCH.

In some implementations, the first parameter may include a harq-feedbackEnablingforSPSactive-r17 parameter, and the second parameter may include a harq-FeedbackOption-Multicast-r17 parameter. In some implementations, the UE may receive, from the BS, at least one TB including one or more PDSCH (receptions). If more than one PDSCH (receptions) are received by the UE in sequential timing periods, the first received one may be called the first PDSCH (reception) and the second received one may be called the second PDSCH (reception). In other words, the first PDSCH (reception) is received at a first period and the second PDSCH (reception) is received at a second period, and the first period is earlier than the second period without overlapping.

Figure 4:
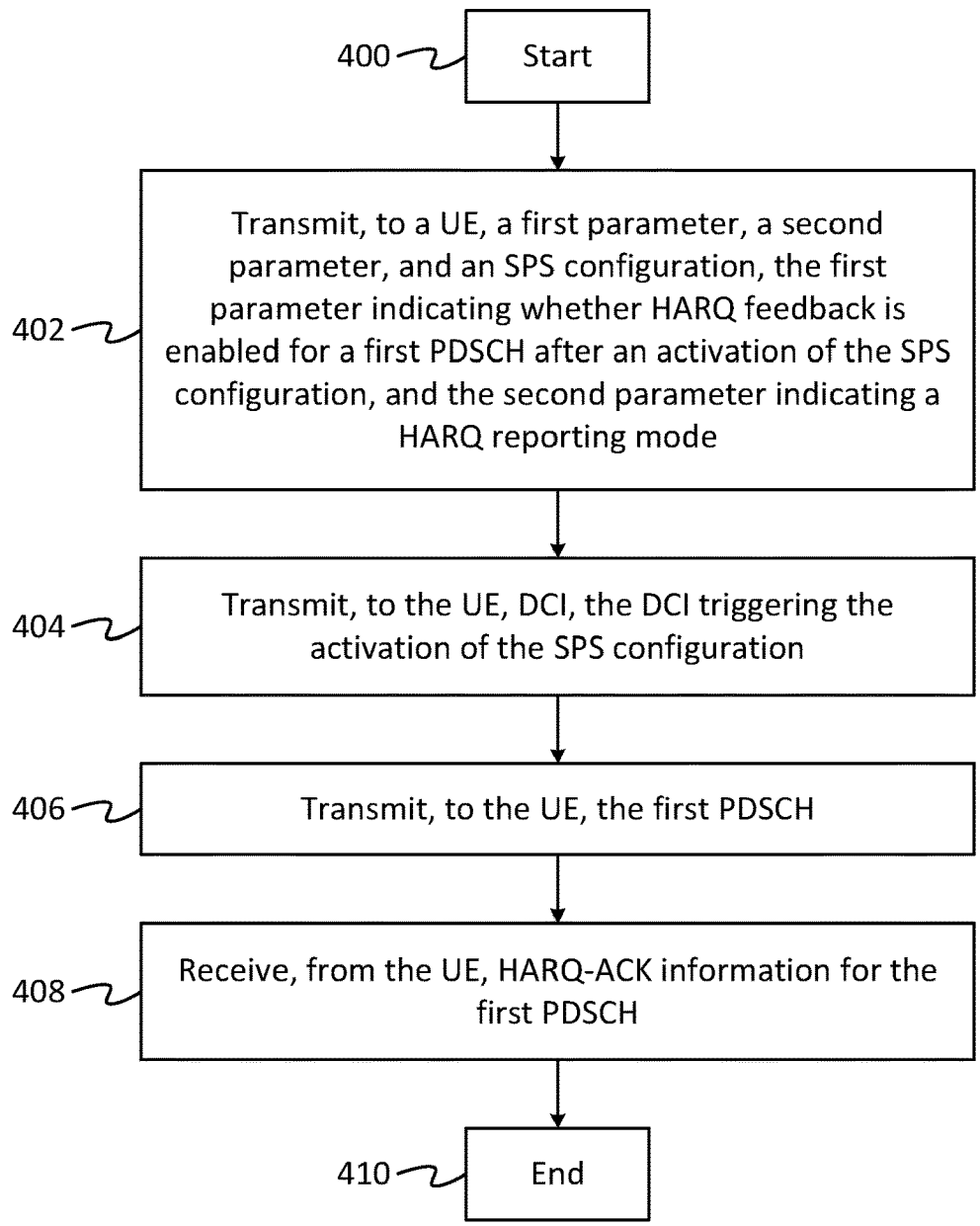
FIG. 4 is a flowchart illustrating a procedure performed by a BS in an NTN, according to an example implementation of the present disclosure.

FIG. 4 is a flowchart illustrating a procedure 40 performed by a BS in an NTN, according to an example implementation of the present disclosure. Similarly, in the example of FIG. 4, the actions of the procedure 40, as illustrated in the figure, are separate actions that are represented as independent blocks. In some other implementations, these separate actions may not be construed as necessarily order dependent, where any two or more actions may also be performed and/or combined with each other or be integrated with other alternate actions that are not limiting the scope of the disclosure. Moreover, in some implementations, one or more of the actions may be adaptively omitted.

As shown in FIG. 4, the procedure 40 for the BS includes the following actions:

Action 400: Start.

Action 402: Transmit, to a UE, a first parameter, a second parameter, and an SPS configuration, the first parameter indicating whether HARQ feedback is enabled for a first PDSCH after an activation of the SPS configuration, and the second parameter indicating a HARQ reporting mode.

Action 404: Transmit, to the UE, DCI, the DCI triggering the activation of the SPS configuration.

Action 406: Transmit, to the UE, the first PDSCH.

Action 408: Receive, from the UE, HARQ-ACK information for the first PDSCH.

Action 410: End.

Since actions of the procedure 40 in FIG. 4 are correspondingly related to actions of the procedure 30 in FIG. 3, detailed descriptions and illustrations for actions 402 to action 408 are adaptively omitted. Noticeably, in some implementations for actions 402 and 404, the BS may simultaneously configure the first parameter and the second parameter to the UE, and the first parameter transmitted to the UE may indicate that the HARQ feedback is enabled for the first PDSCH after the activation of the SPS configuration.

Figure 5:
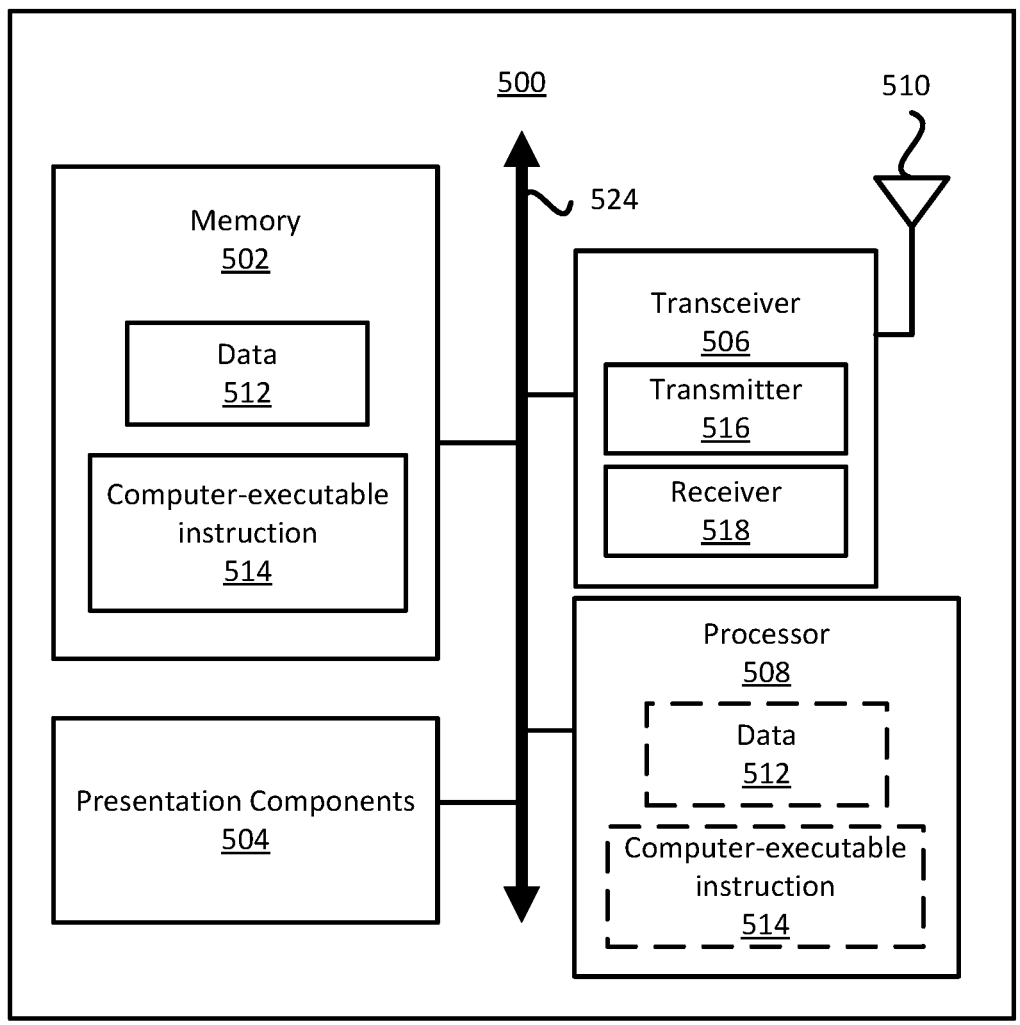
FIG. 5 is a block diagram illustrating a node for wireless communication, according to an example implementation of the present disclosure.

Please refer to FIG. 5, which is a block diagram illustrating a node 500 for wireless communication, according to an example implementation of the present disclosure. As illustrated in FIG. 5, the node 500 includes a transceiver 506, a processor 508, a memory 502, one or more presentation components 504, and at least one antenna 510. The node 500 may also include an RF spectrum band module, a BS communications module, an NW communications module, and a system communications management module, input/output (I/O) ports, I/O components, and power supply (not explicitly illustrated in FIG. 5). Each of these components may be in communication with each other, directly or indirectly, over one or more buses 524. The node 500 may be a UE, an NW, a cell/BS or any operating entity in the wireless communication system that performs various functions disclosed herein, for example, with reference to FIG. 3 and/or FIG. 4.

The transceiver 506 includes a transmitter 516 (e.g., transmitting/transmission circuitry) and a receiver 518 (e.g., receiving/reception circuitry) and may be configured to transmit and/or receive time and/or frequency resource partitioning information. The transceiver 506 may be configured to transmit in different types of subframes and slots, including, but not limited to, usable, non-usable, and flexibly usable subframes and slot formats. The transceiver 506 may be configured to receive data and control channels.

The node 500 may include a variety of computer-readable media. Computer-readable media may be any available media that may be accessed by the node 500 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable media.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal, such as a carrier wave, or other transport mechanism and include any information delivery media.

The term "modulated data signal" may refer to a signal that has one or more of its characteristics set or changed in such a manner as to encode information in the signal. By way of example, and not limitation, communication media may include wired media, such as a wired NW or direct-wired connection, and wireless media, such as acoustic, RF, infrared, and other wireless media. Combinations of any of the previous disclosure should also be included within the scope of computer-readable media.

The memory 502 may include computer-storage media in the form of volatile and/or non-volatile memory. The memory 502 may be removable, non-removable, or a combination thereof. For example, the memory 1502 may include solid-state memory, hard drives, optical-disc drives, etc.

As illustrated in FIG. 5, the memory 502 may store a computer-executable (or readable) program 514 (e.g., software codes or instructions) that are configured to, when executed, cause the processor 508 to perform various functions disclosed herein, for example, with reference to FIG. 3 and/or FIG. 4. Alternatively, the computer-executable instruction 514 may not be directly executable by the processor 508 but may be configured to cause the node 500 (e.g., when compiled and executed) to perform various functions disclosed herein.

The processor 508 (e.g., having processing circuitry) may include an intelligent hardware device, a CPU, a microcontroller, an ASIC, etc. The processor 508 may include memory. The processor 508 may process the data 512 and the computer-executable instruction 514 received from the memory 502, and information received via the transceiver 506, the baseband communications module, and/or the NW communications module. The processor 508 may also process information to be sent to the transceiver 506 for transmission through the antenna 510 to the NW communications module for subsequent transmission to a CN.

One or more presentation components 504 may present data to a person or other device. Examples of presentation components 504 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) in a Non-Terrestrial Network (NTN), the method comprising:
    receiving, from a Base Station (BS), a first parameter, a second parameter, and a Semi-Persistent Scheduling (SPS) configuration, the first parameter indicating whether Hybrid Automatic Repeat reQuest (HARQ) feedback is enabled for a first Physical Downlink Shared Channel (PDSCH) after an activation of the SPS configuration, and the second parameter indicating a HARQ reporting mode;

receiving, from the BS, Downlink Control Information (DCI), the DCI triggering the activation of the SPS configuration;

receiving, from the BS, the first PDSCH;

determining to apply the first parameter, when:
- both the first parameter and the second parameter are simultaneously configured, and
- the first parameter indicates that the HARQ feedback is enabled for the first PDSCH after the activation of the SPS configuration; and transmitting, to the BS, HARQ-Acknowledgement (HARQ-ACK) information for the first PDSCH, wherein the first PDSCH is associated with a Multicast Broadcast Service (MBS).

2. The method of claim 1, wherein the first parameter comprises a harq-feedbackEnablingforSPSactive-r17 parameter.

3. The method of claim 1, wherein when the second parameter indicates a first HARQ reporting mode of the HARQ feedback, transmitting the HARQ-ACK information to the BS comprises transmitting the HARQ-ACK information in response to receiving the first PDSCH.

4. The method of claim 3, wherein when the second parameter indicates a second HARQ reporting mode of the HARQ feedback, transmitting the HARQ-ACK information to the BS comprises transmitting the HARQ-ACK information only when the UE fails to decode the first PDSCH.

5. The method of claim 1, wherein the second parameter comprises a harq-FeedbackOptionMulticast-r17 parameter.

6. A User Equipment (UE) of a wireless communication system in a Non-Terrestrial Network (NTN), the UE comprising:
- at least one processor; and
- at least one memory coupled to the at least one processor and storing computer-executable instructions that, when executed by the at least one processor, cause the UE to:
  - receive, from a Base Station (BS), a first parameter, a second parameter, and a Semi-Persistent Scheduling (SPS) configuration, the first parameter indicating whether Hybrid Automatic Repeat reQuest (HARQ) feedback is enabled for a first Physical Downlink Shared Channel (PDSCH) after an activation of the SPS configuration, and the second parameter indicating a HARQ reporting mode;
  - receive, from the BS, Downlink Control Information (DCI), the DCI triggering the activation of the SPS configuration;
  - receive, from the BS, the first PDSCH;
  - determine to apply the first parameter, when:
    - both the first parameter and the second parameter are simultaneously configured, and
    - the first parameter indicates that the HARQ feedback is enabled for the first PDSCH after the activation of the SPS configuration; and
  - transmit, to the BS, HARQ-Acknowledgement (HARQ-ACK) information for the first PDSCH,
  - wherein the first PDSCH is associated with a Multicast Broadcast Service (MBS).

7. The UE of claim 6, wherein the first parameter comprises a harq-feedbackEnablingforSPSactive-r17 parameter.

8. The UE of claim 6, wherein when the second parameter indicates a first HARQ reporting mode of the HARQ feedback, transmitting the HARQ-ACK information to the BS comprises transmitting the HARQ-ACK information in response to receiving the first PDSCH.

9. The UE of claim 8, wherein when the second parameter indicates a second HARQ reporting mode of the HARQ feedback, transmitting the HARQ-ACK information to the BS comprises transmitting the HARQ-ACK information only when the UE fails to decode the first PDSCH.

10. The UE of claim 6, wherein the second parameter comprises a harq-FeedbackOptionMulticast-r17 parameter.

11. A Base Station (BS) of a wireless communication system in a Non-Terrestrial Network (NTN), the BS comprising:
- at least one processor; and
- at least one memory coupled to the at least one processor and storing computer-executable instructions that, when executed by the at least one processor, cause the BS to:
  - transmit, to a User Equipment (UE), a first parameter, a second parameter, and a Semi-Persistent Scheduling (SPS) configuration, the first parameter indicating whether Hybrid Automatic Repeat reQuest (HARQ) feedback is enabled for a first Physical Downlink Shared Channel (PDSCH) after an activation of the SPS configuration, and the second parameter indicating a HARQ reporting mode;
  - transmit, to the UE, Downlink Control Information (DCI), the DCI triggering the activation of the SPS configuration;
  - transmit, to the UE, the first PDSCH; and
  - receive, from the UE, HARQ-Acknowledgement (HARQ-ACK) information for the first PDSCH,
  - wherein:
    - the BS simultaneously configures the first parameter and the second parameter to the UE, and the first parameter transmitted to the UE indicates that the HARQ feedback is enabled for the first PDSCH after the activation of the SPS configuration, and
    - the first PDSCH is associated with a Multicast Broadcast Service (MBS).

12. The BS of claim 11, wherein the first parameter comprises a harq-feedbackEnablingforSPSactive-r17 parameter.

13. The BS of claim 11, wherein when the second parameter indicates a first HARQ reporting mode of the HARQ feedback, receiving the HARQ-ACK information from the UE comprises receiving the HARQ-ACK information in response to transmitting the first PDSCH.

14. The BS of claim 13, wherein the second parameter indicates a second HARQ reporting mode of the HARQ feedback, receiving the HARQ-ACK information from the UE comprises receiving the HARQ-ACK information only when the UE fails to decode the first PDSCH.

15. The BS of claim 11, wherein the second parameter comprises a harq-FeedbackOptionMulticast-r17 parameter.

* * * * *